Patented Aug. 21, 1951

2,564,674

UNITED STATES PATENT OFFICE 2,564,674

PREPARATION OF ORGANIC SILICON COMPOUNDS

Nicholas D. Cheronis, Chicago, Ill.

No Drawing. Application August 7, 1947,
Serial No. 767,331

10 Claims. (Cl. 260—448.2)

This invention relates to silicon polymers, and more particularly to new methods of reacting organic silicon halides with ammonia or substituted amines.

An object of my invention is the production of ammonolyzed silicone compounds by reacting an aliphatic silicon halide with liquid ammonia or a liquid substituted amine.

Another object of my invention is the production of ammonolyzed silicon compounds by reacting an aromatic silicon halide with liquid ammonia or a liquid substituted amine.

A further object of my invention is the production of a polymerized silicon resin containing $NH_2$ and/or NH groups directly linked to the silicon atom, with the silicon atoms interconnected by —N— groups.

Still another object of my invention is an ammonolyzed silicon resin capable of rapid but controllable polymerization.

Other objects and advantages of my invention will become apparent as the following description of my invention proceeds.

U. S. Patent application Serial No. 616,475, Nicholas D. Cheronis, "Silicon Polymers," filed September 14, 1945 (now abandoned in favor of continuation-in-part application Serial No. 72,548, Nicholas D. Cheronis, "Polymeric Resinous Products Containing Repeating Units of Silicon Linked to Nitrogen and Process for Making Same," filed January 24, 1949), and application Serial No. 643,494, Nicholas D. Cheronis and Edwin L. Gustus, "Preparation of Polymers," filed January 25, 1946, describe methods of ammonolyzing organic silicon halides; application Serial No. 613,009, Nicholas D. Cheronis, "Water-Resistant Leather," filed August 27, 1945 (now abandoned in favor of continuation-in-part application Serial No. 56,663, Nicholas D. Cheronis, "Resin-Impregnated Water-Resistant Leather," filed October 26, 1949), and application Serial No. 643,493, Nicholas D. Cheronis and Edwin W. Newbury, "Leather Treatment," describe the application of hydrolyzed and/or ammonolyzed organic silicon halides to leather. The present invention deals with novel methods of making ammonolyzed organic silicon halides of the general structure disclosed in these applications.

A silicone resin is generally understood to be a polymeric compound corresponding to the type formula

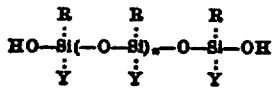

where R stands for an aliphatic or aromatic radical, and where Y stands for an aliphatic or aromatic radical or a hydroxyl group. Such a resin is formed by the condensation of organosilicon hydroxy compounds of the type formula

wherein $n$ does not exceed 2, which in turn are the hydrolysis products of an organic halosilane of the type formula

wherein $n$ also does not exceed 2. Cross linkages within the polymer group may reduce or almost entirely eliminate the hydroxyl groups and replace them by

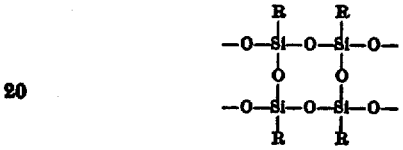

groups.

If organic halosilanes are ammonolyzed in accordance with my invention, and polymerized, organic polymers of the type formula

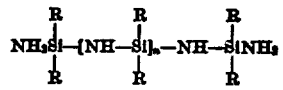

are formed, wherein silicon atoms are interconnected by NH groups and free silicon valences at either end of the polymeric group have $NH_2$ groups attached thereto. The starting material for such compounds are again the organic halosilanes of the type formula

which are treated with ammonia or a substituted amine to substitute the halogens by $NH_2$ groups. Polymerization to the above-described compounds takes place by condensing silicon-attached $NH_2$ groups to NH groups, with evolution of free ammonia. Cross linkages in the polymeric groups of the polymerized ammonolyzed silanes further reduce or almost entirely eliminate $NH_2$ groups bonded to silicon with formation of cross linkages

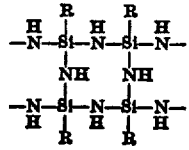

groups.

I have discovered that an organic halosilane may be converted into a corresponding ammonolyzed compound by dissolving it in an organic solvent which is inert towards the organic halosilane (i. e., does not react with it) and reacting it with liquid ammonia (unsubstituted or substituted) in the absence of water or moisture and under conditions about to be described, and permitting the resulting amino silanes to polymerize to the desired degree. Suitable aliphatic solvents are ethers, such as ethyl ether or propyl ether, while suitable aromatic solvents are toluene or xylene. Organic halosilanes suitable in the reaction are, for instance, mono-, or trichlorides, bromides, iodides or fluorides of a silane substituted with respectively 3, 2, or 1 alkyl or aryl group. If more than one organic group is attached to the silicon atom, such organic groups need not be identical. Suitable as ammonolyzing agents, in addition to liquid ammonia, are such compounds as ammonium carbamate and primary alkyl or aryl amines which are liquid at the low temperature at which the reaction takes place, e. g., methylamine (boiling point −6.5° C.), ethylamine (boiling point −16.6° C.), propylamine, n-butylamine, iso-butylamine, benzylamine, naphthylamine, ethylene diamine, hexamethylene diamine, hexamethylene tetramine, phenylene diamine, propenylamine, and other related compounds. In fact, all nitrogen compounds containing at least two replaceable hydrogen atoms directly bonded to a nitrogen atom are suitable for reaction with the silicon compound, so long as care is taken not to introduce any groups into the compound which will prevent polymerization by steric hindrance. To obtain polymerizable compounds, a di- or tri-halogenated organosilane is selected as starting material, inasmuch as hydrolyzed or ammonolyzed monochloro-organosilanes form only dimers.

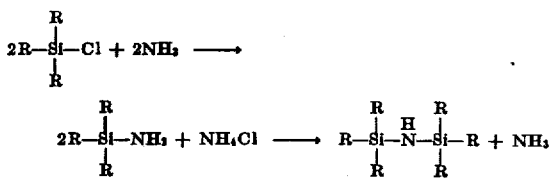

In addition to methyl trichlorosilane, dimethyl dichlorosilane, diethyl dichlorosilane, ethyl trichlorosilane, ethyl tribromosilane, ethyl tri-iodo silane, ethyl trifluorosilane, ethyl dichloro monofluorosilane, propyl tribromosilane, butyl tri-iodo silane, n-propyl trichlorosilane, dipropyl dichlorosilane, iso-propyl trichlorosilane, n-butyl trichlorosilane, iso-butyl trichlorosilane, isoamyl trichlorosilane, benzyl trichlorosilane, naphthyl trichlorosilane, amyl dichlorosilane, propenyl trichlorosilane, phenyl trichlorosilane, diphenyl dichlorosilane, methyl ethyl dichlorosilane, phenyl methyl dichlorosilane, dibenzyl dichlorosilane, p-chlorophenyl silicon trichloride, n-hexyl trichlorosilane, cyclohexyl trichlorosilane, dicyclohexyl dichlorosilane, di-isobutyl dichlorosilane, paratolyl trichlorosilane, di-para-tolyl dichlorosilane, para-styryl trichlorosilane, ethynyl trichlorosilane, which are mono-alkyl, di-alkyl, alkyl-aryl and di-aryl halosilanes whose ammonolysis is described in the above-enumerated earlier applications, I find that such organic halosilanes as allyl trichlorosilane, and di-allyl dichlorosilane (halosilanes containing unsaturated alkyl groups), n-dodecyl trichlorosilane (a long-chain alkyl chlorosilane), p-anisyl trichlorosilane, and para-ethoxy phenyl trichlorosilanes (chlorosilanes containing aromatic oxy-substituted groups) can be ammonolyzed and polymerized in accordance with the present invention.

One preferred example of ammonolysis and polymerization in accordance with the present invention will now be given by way of illustration:

Example

A bucket, equipped with a stirrer, is placed in a Dry Ice bath. Two liters of dry ether are placed into the bucket and stirred until the temperature is about −40° C. One liter of liquid ammonia is now placed into the vessel, and about 1000 grams of an organic chlorosilane (e. g., diethyl-dichlorosilane) dissolved in 1500 cc. of dry ether are slowly added to the stirred system in a controlled stream which is adjusted to maintain the temperature of the reaction at or below −40° C. At the same time, an excess of liquid ammonia, say 3 liters, is added in a controlled stream to maintain the temperature of the reaction at or below −40° C. An excess of ether, of the order of 3 liters, is added to the system towards the end of the reaction to dissolve the silicon compounds and prevent their gelation. Ammonolysis takes place in the system in accordance with the formula

The end product or reaction mixture is removed from the bucket, filtered to remove the ammonium chloride and washed repeatedly, e. g., four times, with ether. To stabilize the solution, most or all of the ether is removed under reduced pressure and/or at an elevated temperature (e. g., 60° to 80° C.) and replaced by a hydrocarbon solvent which is inert towards the formed organic silicon amine ("silamine"). Suitable hydrocarbon solvents are, for example, anhydrous xylene, toluene, hexane, or a cycloparaffin; carbon tetrachloride is also suitable, though not as favorable a solvent medium as the before-mentioned solvents. The yield is 850–900 grams containing 45–50% solids, which is 90–95% of the theoretical yield.

All the organic halosilanes mentioned in the specification may be ammonolyzed in accordance with this example. Absence of water during the reaction is essential to avoid undesired hydrolysis.

It will be understood that the corresponding fluoro-, bromo- and iodo-silanes may be substituted for the chlorosilanes mentioned in the above example.

Mixtures of fully substituted organic silicon monoamines, diamines and triamines can be so adjusted that the resin resulting from their polymerization possesses any desired properties with regard to hardness or tackiness. Thus, an organic silicon triamine polymerized by itself will yield a harder and more brittle film than a mixture of polymerized triamine with a diamine or monoamine. The resins are tough and flexible and thus are eminently adapted to the impregnation of leather, textiles, papers and other flexible materials, and they possess favorable adhesive properties with regard to metal (e. g., steel), glass, etc. They are water repellent, though air permeable.

In order to carry out successfully the ammonolysis of organic halosilanes, it is necessary to maintain at all times during the reaction an excess of the ammonolyzing nitrogen compound, e. g., of liquid ammonia. Likewise, it is necessary to carry out the reaction at temperatures substantially below room temperature; the most favorable temperature differs with each individual ammonolyzing nitrogen compound, and particularly is a function of its boiling point. In the case of liquid ammonia, the reaction temperature must be maintained well below 0° C., and preferably as low as —40° C.

Polymerization of the organic silamines made in accordance with my process takes place at temperatures somewhat above room temperature, in the neighborhood of 60° C. Even at room temperature spontaneous polymerization takes place upon exposure to the air for one or two days. Polymerization takes place by elimination of ammonia groups which separate out in gaseous form and may be collected by appropriate measures, e. g., in a hood. The polymerization, or rather condensation, of an organic diamino-substituted silicon monomer may be represented by the formula

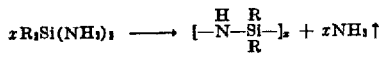

In the condensation of a triamino-substituted organic silicon monomer, cross linkages by NH groups are formed:

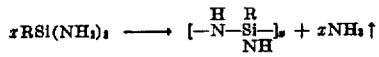

Monoamino-substituted organic silicon monomers form only dimers:

A chief advantage of silamine condensation as compared with the condensation of chlorosilanes is the absence of hydrochloric acid as a byproduct of the condensation; hydrochloric acid is injurious to textiles and other materials which, however, can be safely coated with a silamine polymerized thereon in situ.

The terms "polymerization" and "condensation," as well as "polymerize" and "condense," are used as synonyms throughout the specification and claims.

I do not wish to limit myself to the foregoing specific example of a method to prepare organic silamines in accordance with my invention, nor to any particular proportions of reactants, speeds of reaction, etc. Modifications of my liquid ammonia ammonolysis of organosilicon halides in the absence of water or moisture, within the spirit of my invention, will readily occur to an expert skilled in the art of synthesizing organosilicon compounds. Likewise, other silamines than those specifically enumerated in the foregoing specification and example, e. g., homologues of the named compounds, may be prepared in accordance with my disclosure and thus are within the scope of my invention. I therefore desire to limit my invention only by the appended claims.

I claim:

1. The method of ammonolyzing a mono-organic silicon tri-halide, comprising dissolving said organic silicon halide in an organic solvent inert toward said organic silicon halide, reacting said dissolved organic silicon halide with an ammonolyzing liquid nitrogen compound selected from the class consisting of liquid ammonia and liquid primary amine wherein the amino group is the sole functional group, by simultaneously introducing controlled streams of said dissolved organic silicon halide and of an excess of said liquid nitrogen compound into a reaction vessel at a temperature below room temperature and in the absence of water, and maintaining the temperature of the reaction by adjusting the reactant supply so as to maintain an excess of said ammonolyzing liquid nitrogen compound until said reaction is substantially complete.

2. The method of ammonolyzing a mono-organic silicon tri-halide, comprising dissolving said organic silicon halide in an ether inert toward said organic silicon halide, reacting said dissolved organic silicon halide with an ammonolyzing liquid nitrogen compound selected from the class consisting of liquid ammonia and liquid primary amine wherein the amino group is the sole functional group, by simultaneously introducing controlled streams of said dissolved organic silicon halide and of an excess of said liquid nitrogen compound into a reaction vessel at a temperature below room temperature and in the absence of water, and maintaining the temperature of the reaction by adjusting the reactant supply so as to maintain an excess of said ammonolyzing liquid nitrogen compound until said reaction is substantially complete.

3. The method of ammonolyzing a mono-organic silicon tri-halide, comprising dissolving said organic silicon halide in an ether inert toward said organic silicon halide, reacting said dissolved organic silicon halide with an ammonolyzing liquid nitrogen compound selected from the class consisting of liquid ammonia and liquid primary amine wherein the amino group is the sole functional group, by simultaneously introducing controlled streams of said dissolved organic silicon halide and of an excess of said liquid nitrogen compound into a reaction vessel at a temperature of the order of —40° C. and in the absence of water, and maintaining the temperature of the reaction by adjusting the reactant supply so as to maintain an excess of said ammonolyzing liquid nitrogen compound until said reaction is substantially complete.

4. The method of ammonolyzing a mono-organic silicon tri-halide, comprising dissolving said organic silicon halide in a hydrocarbon solvent inert toward said organic silicon halide, reacting said dissolved organic silicon halide with an ammonolyzing liquid nitrogen compound selected from the class consisting of liquid ammonia and liquid primary amine wherein the amino group is the sole functional group, by simultaneously introducing controlled streams of said dissolved organic silicon halide and of an excess of said liquid nitrogen compound into a reaction vessel at a temperature below room temperature and in the absence of water, and maintaining the temperature of the reaction by adjusting the reactant supply so as to maintain an excess of said ammonolyzing liquid nitrogen compound until said reaction is substantially complete.

5. The method of ammonolyzing a mono-organic aromatic silicon tri-halide, comprising dissolving said organic silicon halide in an organic silicon halide in a hydrocarbon solvent inert toward said organic silicon halide, reacting said dissolved organic silicon halide with an ammonolyzing liquid nitrogen compound selected from the class consisting of liquid ammonia and liquid primary amine wherein the amino group is the sole functional group, by simultaneously introducing controlled streams of said dissolved organic silicon halide and of an excess of said liquid nitrogen compound into a reaction vessel at a temperature below room temperature and in the absence of water, and maintaining the temperature of the reaction by adjusting the reactant supply so as to maintain an excess of said ammonolyzing liquid nitrogen compound until said reaction is substantially complete.

6. The method of ammonolyzing a mono-organic silicon tri-halide, comprising dissolving said organic silicon halide in an aromatic solvent inert toward said organic silicon halide, reacting said dissolved organic silicon halide with an ammonolyzing liquid nitrogen compound selected from the class consisting of liquid ammonia and liquid primary amine wherein the amino group is the sole functional group, by simultaneously introducing controlled streams of said dissolved organic silicon halide and of an excess of said liquid nitrogen compound into a reaction vessel at a temperature below room temperature and in the absence of water, and maintaining the temperature of the reaction by adjusting the reactant supply so as to maintain an excess of said ammonolyzing liquid nitrogen compound until said reaction is substantially complete.

7. The method of ammonolyzing a mono-organic silicon tri-halide, comprising dissolving said organic silicon halide in an organic solvent inert toward said organic silicon halide, reacting said dissolved organic silicon halide with an ammonolyzing liquid nitrogen compound selected from the class consisting of liquid ammonia and liquid primary amine wherein the amino group is the sole functional group, by simultaneously introducing controlled streams of said dissolved organic silicon halide and of an excess of said liquid nitrogen compound into a reaction vessel in the absence of water, at a temperature below room temperature and below the boiling point of said ammonolyzing agent, and maintaining the reaction at said temperature by adjusting the reactant supply so as to maintain an excess of said ammonolyzing liquid nitrogen compound until said reaction is substantially complete.

8. The method of ammonolyzing a mono-organic silicon tri-halide, comprising dissolving said organic silicon halide in an organic solvent inert toward said organic silicon halide, reacting said dissolved organic silicon halide with liquid ammonia in the absence of water, by simultaneously introducing controlled streams of said dissolved organic silicon halide and of an excess of said liquid ammonia into a reaction vessel at a temperature of the order of $-40°$ C., and maintaining the reaction at a temperature of the order of $-40°$ C. by adjusting the reactant supply so as to maintain an excess of liquid ammonia until said reaction is substantially complete.

9. The method of ammonolyzing a mono-alkyl silicon tri-halide, comprising slowly adding said mono-alkyl silicon tri-halide to liquid ammonia at a temperature below the boiling point of ammonia, simultaneously slowly adding an excess of additional liquid ammonia at said temperature, maintaining the reaction product in solution in an inert organic solvent, and separating the reaction product from the excess reactants and from the ammonium halide also formed.

10. The method according to claim 9, wherein said inert organic solvent is ether.

NICHOLAS D. CHERONIS.

REFERENCES CITED

The following references are of record in the file of this patent:

UNITED STATES PATENTS

| Number | Name | Date |
| --- | --- | --- |
| 2,462,635 | Haber | Feb. 22, 1949 |

OTHER REFERENCES

Vigouroux et al.: "Comptes Rendus," vol. 136 (1903), pages 1670–1672.

Sauer: Journal Amer. Chem. Soc., vol. 66 (1944), pages 1707–1710.